(12) United States Patent
Dragan et al.

(10) Patent No.: US 11,462,923 B2
(45) Date of Patent: Oct. 4, 2022

(54) BREAKAWAY MOBILE DEVICE CONNECTION PORT

(71) Applicant: TOYOTA MOTOR ENGINEERING & MANUFACTURING NORTH AMERICA, INC., Plano, TX (US)

(72) Inventors: Christopher E. Dragan, Canton, MI (US); Travis M. Blais, Ann Arbor, MI (US); Angela M. Piculi, Novi, MI (US); Philip J. Babian, Canton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 385 days.

(21) Appl. No.: 16/817,273

(22) Filed: Mar. 12, 2020

(65) Prior Publication Data
US 2021/0288510 A1    Sep. 16, 2021

(51) Int. Cl.
| | |
|---|---|
| *B60R 16/033* | (2006.01) |
| *F16G 11/10* | (2006.01) |
| *F16M 11/14* | (2006.01) |
| *B60R 16/03* | (2006.01) |
| *B60R 21/055* | (2006.01) |
| *B60R 21/045* | (2006.01) |
| *H02J 7/00* | (2006.01) |

(52) U.S. Cl.
CPC ............ *H02J 7/0042* (2013.01); *B60R 16/03* (2013.01); *B60R 16/033* (2013.01); *B60R 21/045* (2013.01); *B60R 21/055* (2013.01); *F16G 11/10* (2013.01); *F16M 11/14* (2013.01)

(58) Field of Classification Search
None
See application file for complete search history.

(56) References Cited

U.S. PATENT DOCUMENTS

| | | |
|---|---|---|
| 6,186,803 B1 | 2/2001 | Garside |
| 7,175,443 B2 | 2/2007 | Mizuno et al. |
| 8,016,609 B1 | 9/2011 | Lin |
| 8,120,895 B2 * | 2/2012 | Zeller .................. F16M 11/041 361/679.01 |
| 8,142,231 B2 | 3/2012 | Tung et al. |
| 8,721,356 B2 | 5/2014 | Webb et al. |
| 9,054,478 B2 | 6/2015 | Golko et al. |
| 9,075,573 B2 | 7/2015 | Hayashida et al. |

(Continued)

FOREIGN PATENT DOCUMENTS

WO    2018/022076 A1    2/2018

*Primary Examiner* — Todd Melton
(74) *Attorney, Agent, or Firm* — Haynes and Boone, LLP

(57) ABSTRACT

Disclosed is a breakaway mobile device connection port for a vehicle. The breakaway mobile device connection port includes a socket within a surface of a vehicle, formed by one or more flexible retention members coupled to the surface. The port further includes a ball-type bearing positioned partially within the socket, a female connector positioned in the bearing outside the socket and configured to receive a male connector, and a harness cable coupled to the bearing, linking the female connector to an electrical system or data system of the vehicle. The bearing is configured to swivel on at least one axis within the socket, and an impact force on the male connector that exceeds a first threshold value causes the bearing to be pushed completely into the socket.

18 Claims, 5 Drawing Sheets

(56) References Cited

U.S. PATENT DOCUMENTS

| | | | |
|---|---|---|---|
| 9,160,124 B2 | 10/2015 | Colahan et al. | |
| 9,178,299 B2 | 11/2015 | Alexia et al. | |
| 9,201,453 B2 | 12/2015 | Stanley | |
| 11,067,117 B2 * | 7/2021 | Recker | F16C 11/0657 |

* cited by examiner

BREAKAWAY MOBILE DEVICE CONNECTION PORT

TECHNICAL FIELD

The subject matter described herein relates to a mobile device connection port for a vehicle that is configured to reduce maximum force imparted on a vehicle occupant by a protruding male connection during a collision. This technology has particular but not exclusive utility for cars and trucks.

BACKGROUND

Vehicle occupants frequently carry mobile devices such as laptops, notebook computers, digital cameras, smartphones, tablets, and smartwatches. Battery life of such devices may be limited, such that frequent recharging is required. Furthermore, in some instances it may be desirable to establish a data connection between the vehicle and a mobile device using a cable interface. Therefore, many modern vehicles include one or more mobile device connection ports (e.g., female USB connection ports, female 12 VDC power ports, female 120 VAC power outlets, etc.) that can provide charging power and/or data connections to a mobile device. However, because people may tend to plug and unplug cables with more force than necessary, both the female ports and the male connectors that plug into these ports are typically of rigid design. The male connector may for example include rigid corners or other protuberances. During a collision event or other body movement, (for example, during ingress/egress from the vehicle), the extremities or other body parts of a vehicle occupant may make unintended contact with a protruding male connector that is plugged into a female port within the vehicle. Where such contact is forceful or abrupt, the protruding male connector presents a risk of injury to the vehicle occupant.

The information included in this Background section of the specification, including any references cited herein and any description or discussion thereof, is included for technical reference purposes only and is not to be regarded as limiting.

SUMMARY

The present disclosure is generally directed to a mobile device connection port for a vehicle, wherein the connection port is configured to reduce maximum force imparted by a protruding male connection portion of the mobile device connection port to a vehicle occupant during a collision or unintended contact (for example, ingress/egress), thereby reducing risk of injury or discomfort to the vehicle passenger. The proposed mobile device connection port includes a ball-type female connection portion housed within an opening defined by flexible retention fingers, and configured to receive a male connection portion of a mobile device connection, which is a potential impact point with a passenger. When force is exerted on the male connection portion (for example, by a passenger contacting the male connection portion), the ball-type female connection portion is able to rotate out of the way. For larger forces, the flexible retention fingers deform or flex in a manner that allows the ball-type female connection portion to retract into the vehicle and away from the point of contact. The breakaway mobile device connection port provides an improvement over the current technology by providing a mobile device connection with a reduced risk of passenger discomfort or injury due to unintentional contact.

The breakaway mobile device connection port disclosed herein has particular, but not exclusive, utility for reducing the potential of injury or discomfort for the occupants of cars and trucks. One general aspect of the breakaway mobile device connection port includes a connection device including a surface of a vehicle; a socket within the surface of the vehicle, where the socket is formed by one or more flexible retention members coupled to the surface; a ball-type female connection portion including: a bearing positioned partially within the socket; a female connector positioned within a portion of the bearing located outside the socket and configured to receive a first male connector of a cable; and a harness cable coupled to the bearing, linking the female connector to an electrical system or data system of the vehicle, where the bearing is configured to swivel on at least one axis within the socket; and where an impact force on the first male connector that exceeds a first threshold value causes the bearing to be pushed completely into the socket.

Implementations may include one or more of the following features. The device where the impact force on the first male connector that exceeds the first threshold value causes the bearing to be pushed into the socket until the male connector is flush with the surface of the vehicle. The device where the impact force on the male connector that exceeds the first threshold value causes the bearing to be pushed into the socket until the male connector is within or behind the socket. The device where the first threshold value is between 70 and 130 newtons. The device where an impact force on the first male connector that exceeds a second threshold value but does not exceed the first threshold value causes the bearing to be rotated within the socket by an angle that leaves the female connector positioned outside the socket. The device where the second threshold value is between 0.1 and 69.9 newtons. The device where the female connector is a USB, 12 VDC, HDMI, AUX, or 120 VAC connector. The device where the device cable includes a second male connector connectable to a mobile electronic device. The device further including the device cable. The device further including the vehicle.

One general aspect includes a method including, in a surface of a vehicle, providing a socket formed by one or more flexible retention members coupled to the surface; providing: a ball-type female connection portion including: a bearing positioned partially within the socket; a female connector positioned within a portion of the bearing located outside the socket and configured to receive a first male connector of a device cable; a harness cable coupled to the bearing, linking the female connector to an electrical system or data system of the vehicle, where the bearing is configured to swivel on at least one axis within the socket; and where an impact force on the first male connector that exceeds a first threshold value causes the bearing to be pushed completely into the socket.

Implementations may include one or more of the following features. The method where the impact force on the first male connector that exceeds the first threshold value causes the bearing to be pushed into the socket until the male connector is flush with the surface of the vehicle. The method where the impact force on the male connector that exceeds the first threshold value causes the bearing to be pushed into the socket until the male connector is within or behind the socket. The method where the first threshold value is between 70 and 130 newtons. The method where an impact force on the first male connector that exceeds a second threshold value but does not exceed the first threshold value causes the bearing to be rotated within the socket by an angle that leaves the female connector positioned outside the socket. The method where the second threshold value is between 0.1 and 69.9 newtons. The female connector is a USB, 12 VDC, HDMI, or 120 VAC connector. The device cable includes a second male connector connectable to a mobile electronic device.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the breakaway mobile device connection port, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
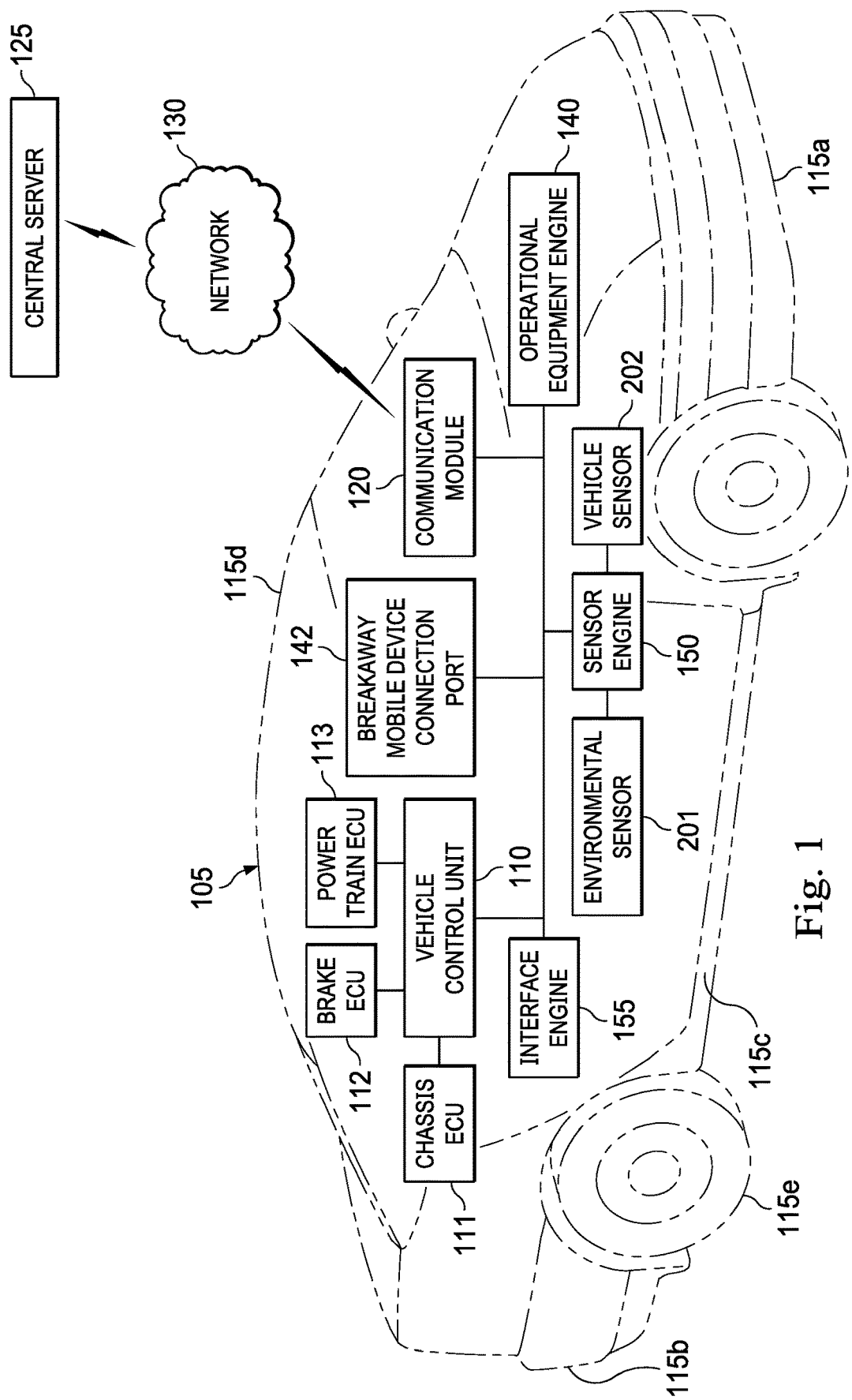
FIG. 1 is a diagrammatic illustration of a vehicle including a breakaway mobile device connection port in accordance with at least one embodiment of the present disclosure.

In accordance with at least one embodiment of the present disclosure, a breakaway mobile device connection port for a vehicle is provided that is configured to reduce maximum force imparted by a protruding male connection portion of the mobile device connection port to a vehicle occupant during a collision or unintended contact (for example, during ingress or egress from the vehicle), thereby reducing risk of injury or discomfort to the vehicle passenger.

The proposed mobile device connection port includes a ball-type female connection portion housed within an opening defined by flexible retention fingers. The ball-type female connection portion is configured to receive a male connection portion of a mobile device connection (for example, at one end of a USB, HDMI, AUX, 12 VDC or 120 VAC cable). The protruding male connection portion is a potential impact point for a vehicle occupant, with the potential to cause injury or discomfort during unintentional contact. The shape, stiffness, and/or surface friction of the flexible retention fingers are tuned to control rotation and/or displacement of the ball-type female connection portion, and a bearing surface of the ball-type female connection portion is also tuned to control rotation of the ball-type female connection portion within the opening. When a force is exerted on the male connection portion (for example, by a vehicle occupant making unintentional contact with the male connection portion), the ball-type female connection portion is able to rotate away from the force, thus reducing or realigning the force and reducing the risk of injury or discomfort to the vehicle occupant. For larger forces (e.g., those that might occur in a collision or sudden deceleration), the flexible retention fingers are able to deform or flex in a manner that allows the ball-type female connection portion to retract into the vehicle and away from the point of contact, thus reducing the magnitude or duration of the impact force of the male connection point on the vehicle occupant. The breakaway mobile device connection port provides an improvement over the current technology by providing a mobile device connection with a reduced risk of passenger discomfort or injury due to unintentional contact.

The present disclosure aids substantially in reducing injury and discomfort to vehicle occupants, by improving the ability of a connected male connector to retreat from unintentional contact. Implemented in a vehicle dashboard or other interior location, the breakaway mobile device connection port disclosed herein provides practical reduction in unwanted contact forces. This improved mechanical compliance transforms a potentially injury-causing rigid protuberance into a rotatable, retractable protuberance that reduces the risk of injury or discomfort. This unconventional approach improves the safety of the vehicle, by reducing contact time and/or contact force between a vehicle occupant and a protruding male connector attached to the breakaway mobile device connection port.

These descriptions are provided for exemplary purposes only, and should not be considered to limit the scope of the breakaway mobile device connection port. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic illustration of a vehicle 105 including a breakaway mobile device connection port 142 in accordance with at least one embodiment of the present disclosure. The vehicle 105, such as an automobile, may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 may be operably coupled to, and adapted to be in communication with, a vehicle control unit 110. The communication module 120 may be adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and a breakaway mobile device connection port 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
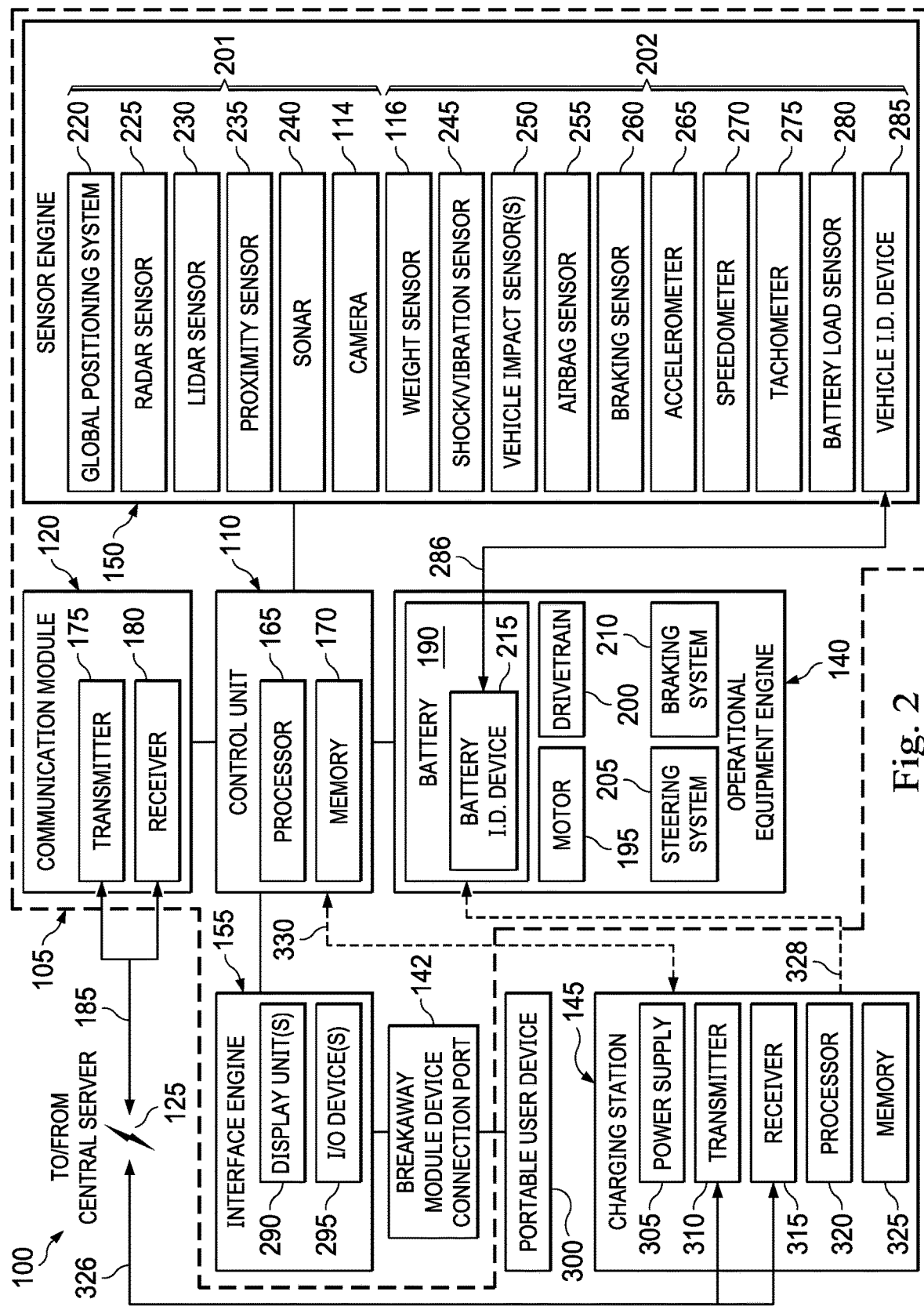
FIG. 2 is a diagrammatic illustration, in a block-diagram form, of at least a portion of the vehicle systems including the breakaway mobile device connection port of FIG. 1, in accordance with at least one embodiment of the present disclosure.

FIG. 2 is a diagrammatic illustration, in a block-diagram form, of at least a portion of the vehicle systems including the breakaway mobile device connection port 142 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, the vehicle battery 190 includes a battery identification device 215. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a radar sensor 225, a lidar sensor 230, a proximity sensor 235, a sonar sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a camera 114, a weight sensor 116, or any combinations thereof. Readings from the sensor engine 150 are fed back to the vehicle control unit 110. In some examples, the vehicle identification device 285 is adapted to communicate with the battery identification device 215 (or vice versa), as indicated by arrow 286.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of, multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may include a a Bluetooth communication interface, a touch-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is mobile electronic device or smartphone such as, for example, an iPhone® by Apple Incorporated.

The interface engine 155 may include a charging and communication port (e.g., a USB port) for electrically charging and/or electronically communicating with the portable user device 300. In the example shown in FIG. 2, this charging and communication port is a breakaway mobile device connection port 142 for reversibly connecting the portable user device 300 to the vehicle 105 in a manner that provides some impact protection to vehicle occupants in the case of a vehicle crash or rapid deceleration. In some embodiments, the breakaway mobile device connection port 142 comprises a standalone housing with its own connections to power and data systems of the interface engine 155. In other embodiments, the breakaway mobile device connection port 142 exists as a subcomponent of another vehicle subsystem such as a display unit 290, I/O device 295, or another engine or control unit of the vehicle 105.

A reader of ordinary skill in the art will understand that other components or arrangements of components may be found in a vehicle 105, and that the same general principles apply to electric vehicles, internal combustion vehicles, and hybrid vehicles.

Figure 3:
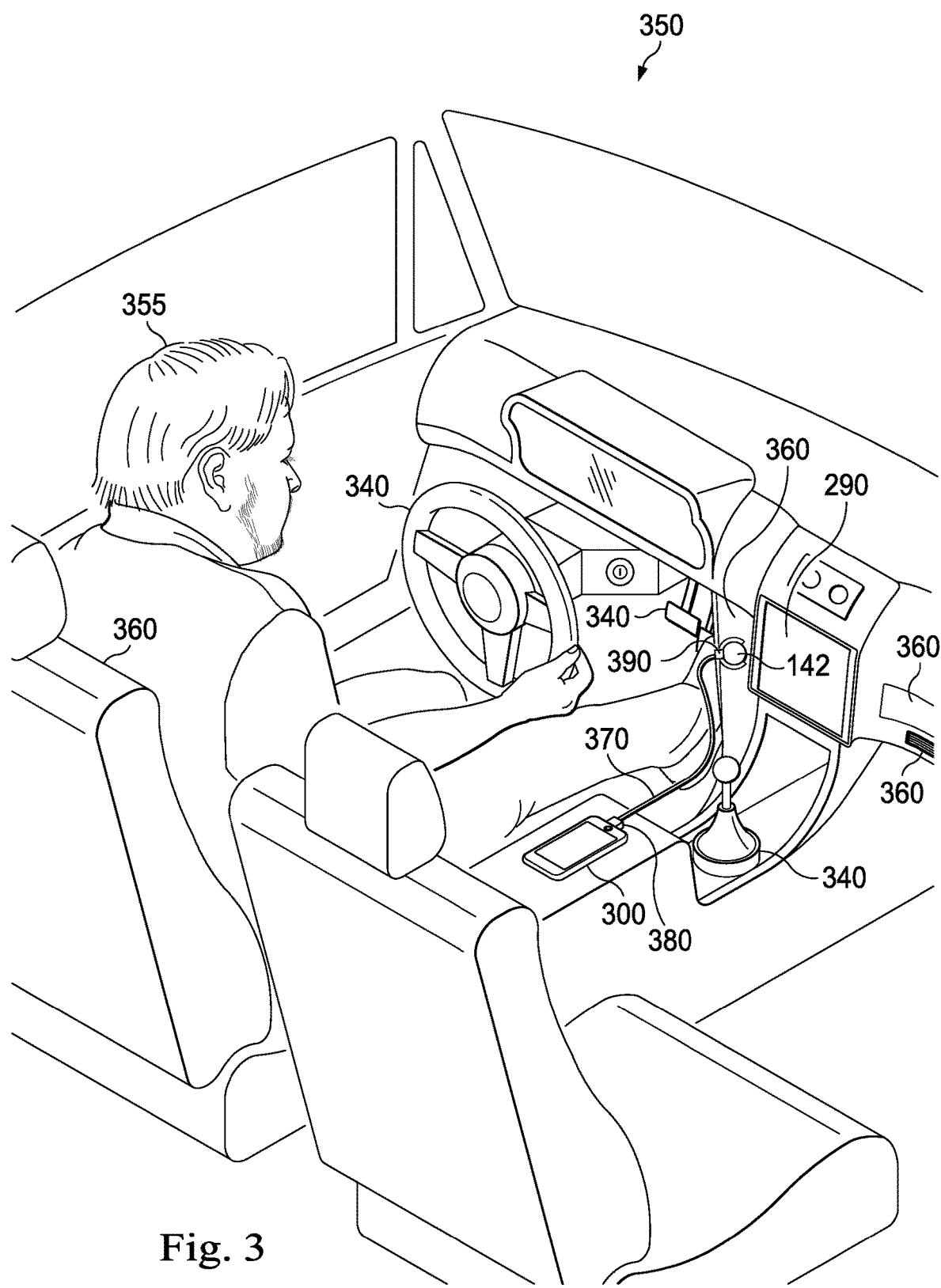
FIG. 3 is a diagrammatic illustration of an example vehicle cabin that includes a breakaway mobile device connection port in accordance with at least one embodiment of the present disclosure.

FIG. 3 is a diagrammatic illustration of an example vehicle cabin 350 that includes a breakaway mobile device connection port 142 in accordance with at least one embodiment of the present disclosure. Visible are vehicle interior design trim features 360 and driving controls 340, a head unit 290, a mobile device 300, and a vehicle occupant 355. In an example, vehicle trim 360 is made from polymer materials such as polypropylene resin, ABS resin, and/or nylon resin. In this example, the breakaway mobile device connection port 142 is positioned within a vehicle trim feature 360, and the mobile device 300 is connected to the breakaway mobile device connection port 142 via a device cable 370 that includes a male mobile device connector 380 and a male charging and data port connector 390. The male charging and data port connector 390 may be plugged into the breakaway mobile device connection port as shown below in FIGS. 4 and 5. The breakaway mobile device connection port 142 may supply a combination of electrical charging for the mobile device 300 (e.g., using power drawn from the interface engine 155 of FIG. 2) and electronic data communications with the mobile device 300 (e.g., between the mobile device 300 and the interface engine 155 or I/O device 295).

During a crash, rapid deceleration, or occupant movement within the vehicle cabin 350 (e.g., during vehicle ingress or egress), an occupant 355 of the vehicle 105 may contact various portions of the vehicle cabin 350, including driving controls, vehicle trim components 360, or a data port connector 390 of a data and charging cable or device cable 370. In the case of a protruding male connector 390 such contact may cause discomfort or injury. To mitigate this risk, the breakaway mobile device connection port 142 is configured to rotate and/or retract upon impact, such that if the occupant 355 strikes the breakaway mobile device connection port 142, or a data port connector 390 plugged into the breakaway mobile device connection port 142, the breakaway mobile device connection port 142 retracts from the surface of the vehicle trim 360, or other surface in which the breakaway mobile device connection port is mounted. Impact forces and durations to the occupant 355 may thus be reduced, and the risk of injury or discomfort to the occupant 355 accordingly decreased.

Figure 4:
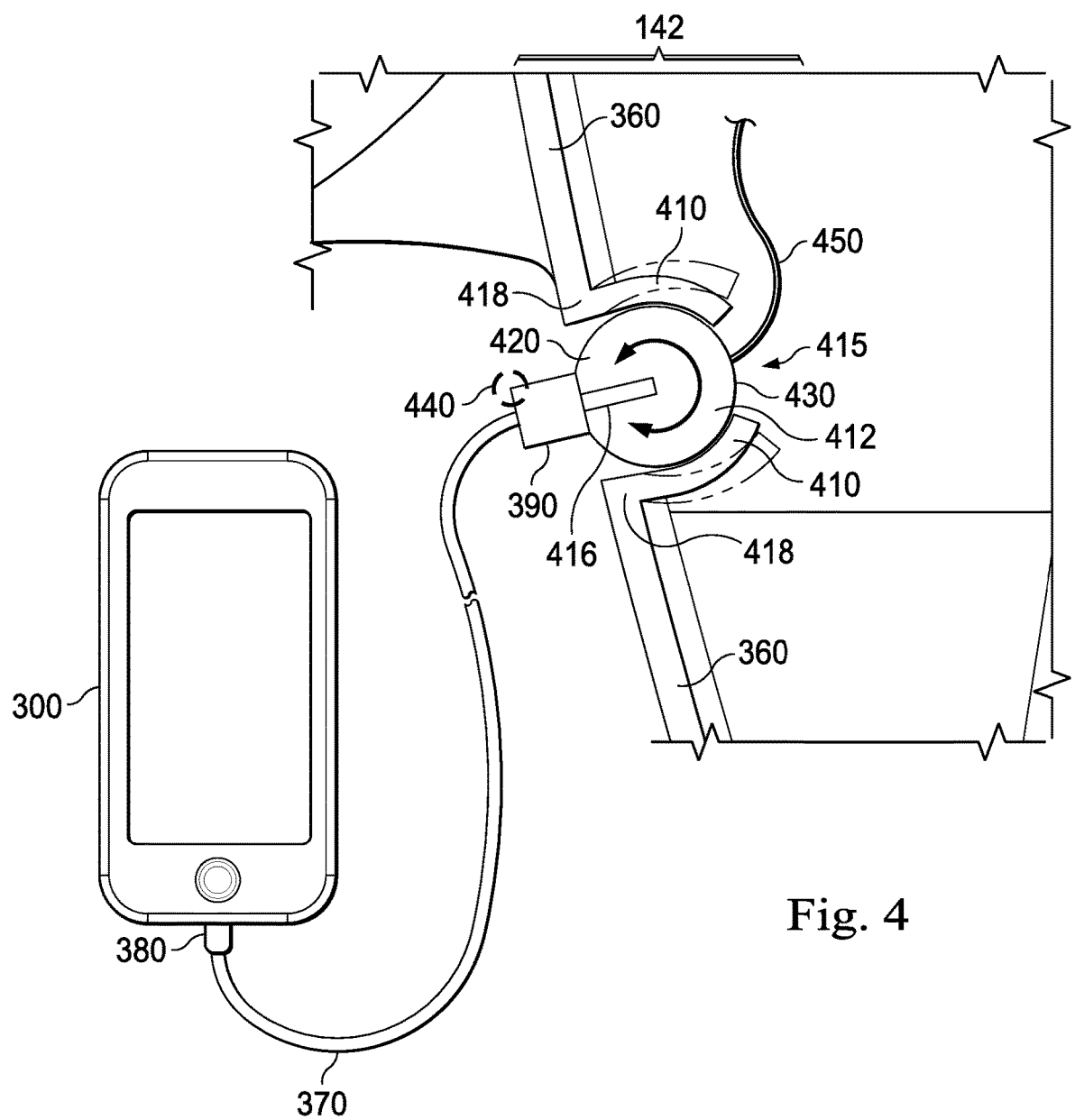
FIG. 4 is a diagrammatic illustration of an example breakaway mobile device connection port in accordance with at least one embodiment of the present disclosure.

FIG. 4 is a diagrammatic illustration of an example breakaway mobile device connection port 142 in accordance with at least one embodiment of the present disclosure. In the example shown in FIG. 4, the breakaway mobile device connection port 142 is mounted in a vehicle trim surface 360, and includes flexible retention fingers or retention members 410 that are attached to, and face inward from, the vehicle interior trim surface 360, or other vehicle surface in which the breakaway mobile device connection port 142 is mounted. The trim surface 360 includes a lip 418. The breakaway mobile device connection port 142 also includes a ball-type female connection portion 420 (e.g., a USB-A, USB-B, or USB-C type connection, cigarette lighter or 12-volt DC power port type connection, 120-volt AC power outlet type connection, etc.) positioned within an opening or socket 415 defined by the retention fingers 410, and a harness cable 450 configured to carry power and/or signals between the female connection portion 420 and an electrical system or data system of the vehicle 105 (e.g., the interface engine 155 or an I/O device 295 of the vehicle 105).

The female connection portion includes a ball or bearing 412 and a female connector 416. The ball or bearing 412 of the ball-type female connection portion 420 may be similar to the barrel of a barrel-style air vent or air register which can pivot on two axes. In an example, the ball or bearing 412 may be more rigid than the flexible retention fingers 410, and may be made for example of metal or hard plastic (e.g., nylon). The ball-type female connection portion 420 also includes a bearing surface 430 that enables the ball-type female connection portion 420 to swivel within the opening or socket 415 formed by the retention fingers 410, through angles on at least one axis that leave the female connector 416 outside of the socket 415 and connectable by the male connector 390. In an example, the bearing surface 430 enables the ball-type female connection portion 420 to swivel three hundred and sixty (360) degrees within the opening or socket 415 formed by the retention fingers 410. In an example, the bearing surface is smooth and uncoated, although it may also be textured or coated depending on the implementation, e.g., to affect the friction or noise (e.g., squeaking) associated with rotating the ball-type female connection portion 420 within the opening or socket 415.

The flexible retention fingers 410 may be part of the same molded piece or pieces as the vehicle trim 360, or may be attached to the vehicle trim 360. The flexible retention fingers 410 may be made for example of a mildly flexible or compliant polymer such as polypropylene resin, or may be made of a flexible metal such as spring steel. In some embodiments, the shape, compliance level, or flexibility level of the retention fingers 410, as well as the surface friction of the bearing surface 430 and retention fingers 410, is selected such that the ball-type female connection portion 420 is able to swivel through a given range around at least one and preferably two axes when a torquing or surface-parallel force is applied to it (e.g., leftward toward the driver, rightward toward the passenger, upward toward a mounted device, or downward toward a device in a cup holder or other storage location), but remains in a fixed or relatively fixed orientation when no torquing force is applied to it. In some embodiments, the retention fingers or flexible retention members 410 may be replaced with compliant flanges, posts, clips, springs, or a flexible socket.

In an example, the portable user device 300 is connected to a device cable 370 by a male device connector 380. The device cable 370 also includes a male charging and data port connector 390, which plugs into the ball-type female connection portion 420. This may create one or more potential impact points 440 on the male data port connector 390 or ball-type female connection portion 420, which a vehicle occupant 355 may inadvertently contact in the case of a vehicle crash, rapid deceleration, or other movement within the vehicle cabin. Such inadvertent contact carries the risk of injury or discomfort to the vehicle occupant 355.

To minimize the risk of injury or discomfort when an occupant 355 contacts an impact point 440, the ball-type female connection portion 420 can respond in either or both of two ways: first, by swiveling, or second, by retracting. As noted above, the ball-type female connection portion 420 is able to swivel through a given range when a torquing force is applied to it. When an occupant 355 collides with an impact point 440, this swiveling may, for example, rotate the male charging and data port connector 390 away from the impacting body of the vehicle occupant 355, thus reducing or realigning the contact force and thereby reducing the risk of injury or discomfort. Additionally, because the retention fingers 410 that hold the ball-type female connection portion 420 in the opening or socket 415 are flexible or otherwise compliant, an impact force may cause the ball-type female connection portion 420 to be pushed inward into the opening or socket 415, so that it is further from the surface of the vehicle trim 360. This may also reduce or realign the contact force, thereby reducing the risk of injury to the vehicle occupant. In some embodiments, the shape, compliance level, or flexibility level of the retention fingers 410, as well as the surface friction of the bearing surface 430 and retention fingers 410, is selected such that the ball-type female connection portion 420 is able to retract or displace inward when a force is applied that is orthogonal to the surface of the ball-type female connection portion 420. However, the shape, flexibility, and surface friction of the retention fingers 410 and bearing surface 430 are also selected such that the ball-type female connection portion 420 remains in a fixed or relatively fixed linear position within the opening or socket 415 when no orthogonal force is applied to it, or when an orthogonal force is applied to it that is too small or gradual to result in discomfort or injury to the vehicle occupant 355.

Figure 5:
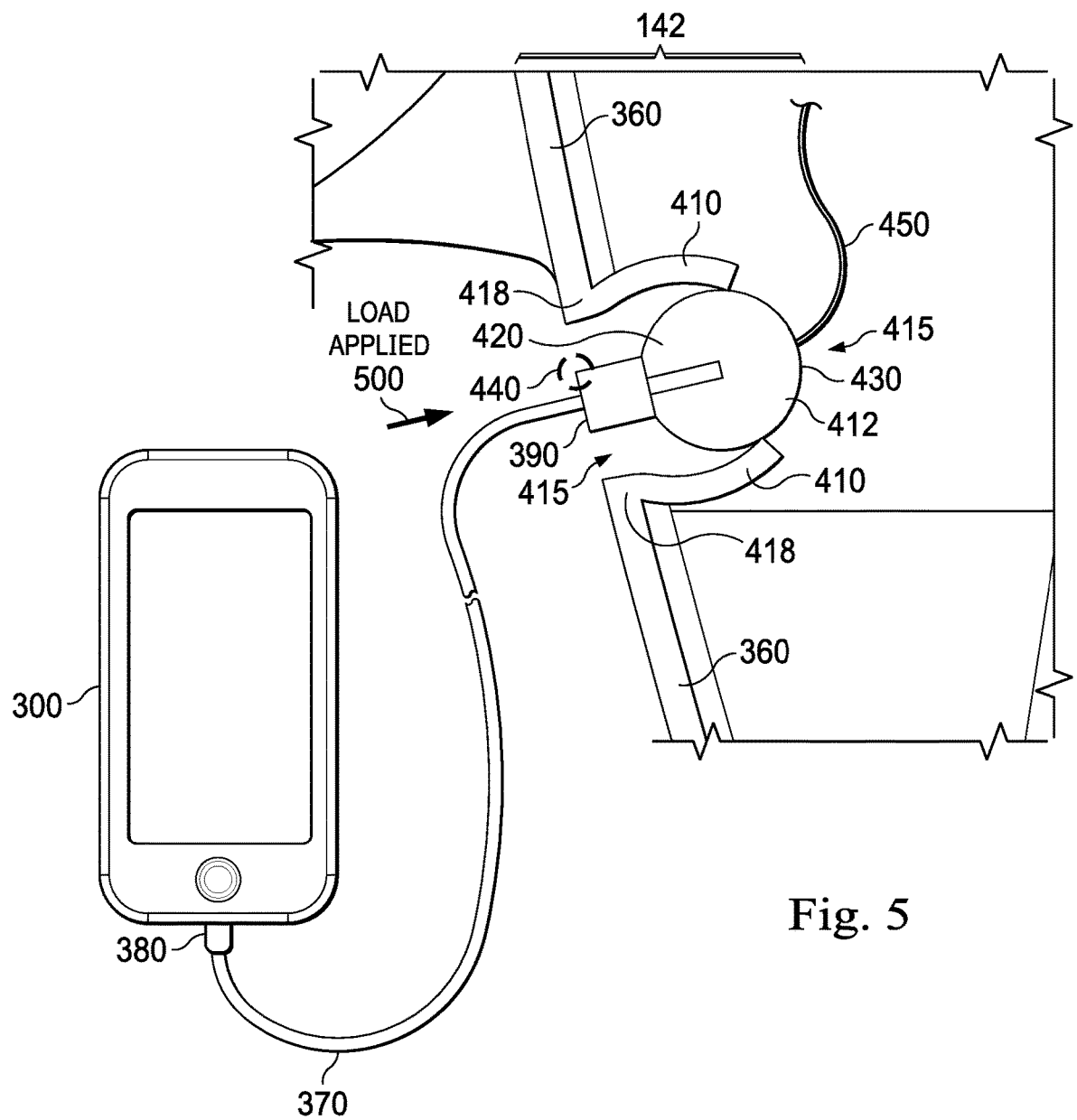
FIG. 5 is a diagrammatic illustration of an example breakaway mobile device connection port in accordance with at least one embodiment of the present disclosure.

FIG. 5 is a diagrammatic illustration of an example breakaway mobile device connection port 142 in accordance with at least one embodiment of the present disclosure. In the example shown in FIG. 5, a load or force 500 has been applied to an impact point 440 on the male charging and data port connector 390. The impact load 500 has caused the ball-type female connection portion 420 to push inward or downward against the retention fingers 410, causing the retention fingers 410 to flex, and driving the ball-type female connection portion 420 deeper into the opening or socket 415 defined by the retention fingers 410. This permits the ball-type female connection portion 420 to be displaced inward until, for example, no portion of the male charging and data port connector 390 projects outward beyond the surface of the interior vehicle trim 360. The inward displacement of the ball-type female connection portion 420 against the retaining force of the retention fingers 410 may absorb or dissipate a certain amount of impact energy. Furthermore, in the retracted or inward-displaced configuration of the ball-type female connection portion 420, the impact point 440 is no longer able to concentrate the impact load 500 on the vehicle occupant 355. Rather, the impact load 500 of the vehicle occupant may be distributed across the surface of the vehicle trim 360, presenting a larger surface area and therefore greater distribution of the impact force. This may tend to reduce the risk of injury or discomfort to the vehicle occupant 355. In some cases, the material of the vehicle trim 360 may also be more compliant than the material of the male charging and data port connector 390, further reducing the risk of injury or discomfort to the vehicle occupant 355.

In an example, the threshold force required to push the ball-type female connection portion 420 deeper into the opening or socket 415 may be between 7 and 13 kilograms of force (kgf), or between 70 and 130 Newtons (N), although other forces both larger and smaller may be used instead or in addition. In an example, once the ball-type female connection portion 420 has been retracted into the opening or socket 415, the owners, users, or operators of the vehicle may not be able to pull the ball-type female connection portion 420 back into its original position and thus restore the breakaway mobile device connection port 142 to a usable condition. Rather, this repair may require temporary removal of trim panels 360. Such an operation typically performed by the service department of a dealership.

As will be readily appreciated by those having ordinary skill in the art after becoming familiar with the teachings herein, the breakaway mobile device connection port advantageously reduces the risk of injury or discomfort to a vehicle occupant resulting from unintentional contact between the vehicle occupant and a male connector connected to the mobile device connection port. Depending on the implementation, a number of variations are possible on the examples and embodiments described above. For example, multiple female receiving ports may be provided in the ball-type female connection portion, or multiple ball-type female connection portions may be provided. One or more breakaway mobile device connection ports may be located within the vehicle to be accessible from the front and/or back seats, or in cargo areas, or even external to the vehicle. The size and shape of the retention fingers or female connection portion may be different that shown herein. For example, the ball of the female connection portion may be replaced with a cylinder, oblate spheroid, or other shape that provides a similar function to that described above. The breakaway mobile device connection port can be used in many different vehicle types, including on-road and off-road vehicles, motorcycles, trikes, ATVs, watercraft, and aircraft, as well as electric bicycles and scooters.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the breakaway mobile device connection port. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the breakaway mobile device connection port as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A connection device comprising;
   a surface of a vehicle;
   a socket within the surface of the vehicle, wherein the socket is formed by one or more flexible retention members coupled to the surface;
   a ball-type female connection portion comprising:
      a bearing positioned partially within the socket;
      a female connector positioned within a portion of the bearing located outside the socket and configured to receive a first male connector of a cable;
      a harness cable coupled to the bearing, linking the female connector to an electrical system or data system of the vehicle;
   wherein the bearing is configured to swivel on at least one axis within the socket; and
   wherein an impact force on the first male connector that exceeds a first threshold value causes the bearing to be pushed completely into the socket.

2. The device of claim 1, wherein the impact force on the first male connector that exceeds the first threshold value causes the bearing to be pushed into the socket until the male connector is flush with the surface of the vehicle.

3. The device of claim 1, wherein the impact force on the male connector that exceeds the first threshold value causes the bearing to be pushed into the socket until the male connector is within or behind the socket.

4. The device of claim 1, wherein the first threshold value is between 70 and 130 Newtons.

5. The device of claim 1, wherein an impact force on the first male connector that exceeds a second threshold value but does not exceed the first threshold value causes the bearing to be rotated within the socket by an angle that leaves the female connector positioned outside the socket.

6. The device of claim 5, wherein the second threshold value is between 0.1 and 69.9 Newtons.

7. The device of claim 1, wherein the female connector is a USB, 12 VDC, HDMI, AUX, or 120 VAC connector.

8. The device of claim 1, wherein the device cable comprises a second male connector connectable to a mobile electronic device.

9. The device of claim 8, further comprising the device cable.

10. The device of claim 1, further comprising the vehicle.

11. A method comprising;
    in a surface of a vehicle, providing a socket formed by one or more flexible retention members coupled to the surface;
    providing a ball-type female connection portion comprising:
       a bearing positioned partially within the socket;
       a female connector positioned within a portion of the bearing located outside the socket and configured to receive a first male connector of a device cable;
       a harness cable coupled to the bearing, linking the female connector to an electrical system or data system of the vehicle;
    wherein the bearing is configured to swivel on at least one axis within the socket; and
    wherein an impact force on the first male connector that exceeds a first threshold value causes the bearing to be pushed completely into the socket.

12. The method of claim 11, wherein the impact force on the first male connector that exceeds the first threshold value causes the bearing to be pushed into the socket until the male connector is flush with the surface of the vehicle.

13. The method of claim 11, wherein the impact force on the male connector that exceeds the first threshold value causes the bearing to be pushed into the socket until the male connector is within or behind the socket.

14. The method of claim 11, wherein the first threshold value is between 70 and 130 Newtons.

15. The method of claim 11, wherein an impact force on the first male connector that exceeds a second threshold value but does not exceed the first threshold value causes the bearing to be rotated within the socket by an angle that leaves the female connector positioned outside the socket.

16. The method of claim 15, wherein the second threshold value is between 0.1 and 69.9 Newtons.

17. The method of claim 11, wherein the female connector is a USB, 12 VDC, HDMI, or 120 VAC connector.

18. The method of claim 11, wherein the device cable comprises a second male connector connectable to a mobile electronic device.

* * * * *